United States Patent [19]

Bosich

[11] Patent Number: 4,922,232
[45] Date of Patent: May 1, 1990

[54] LEAKAGE CONTAINMENT AND DETECTION SYSTEMS

[76] Inventor: Joseph F. Bosich, 9405 Brakeman Rd., Chardon, Ohio 44024

[21] Appl. No.: 261,173

[22] Filed: Oct. 21, 1988

[51] Int. Cl.$^5$ .......................................... G08B 21/00
[52] U.S. Cl. ..................................... 340/605; 73/49.2; 200/61.04
[58] Field of Search ..................... 340/603, 604, 605; 73/337, 49.2; 200/61.04, 61.08

[56] References Cited

U.S. PATENT DOCUMENTS

| | | | |
|---|---|---|---|
| 3,564,526 | 2/1967 | Butts | 340/524 |
| 3,908,468 | 9/1975 | Katsuta et al. | 73/49.2 |
| 3,970,863 | 7/1976 | Kishikawa et al. | 200/61.04 X |
| 3,997,886 | 12/1976 | Lerner | 340/605 X |
| 4,346,591 | 8/1982 | Evans | 340/605 X |
| 4,357,113 | 11/1982 | Brooks | 374/4 |
| 4,414,441 | 11/1983 | Perry et al. | 200/61.04 |
| 4,534,662 | 8/1985 | Barlian | 340/605 X |
| 4,568,925 | 2/1986 | Butts | 340/605 |
| 4,644,354 | 2/1987 | Kidd | 340/870.27 |
| 4,672,366 | 6/1987 | Butts | 340/605 |
| 4,673,926 | 6/1987 | Gorman | 340/605 |
| 4,682,492 | 7/1987 | Green | 73/49.2 |
| 4,688,027 | 8/1987 | Widener | 340/604 |
| 4,696,186 | 9/1987 | Sharp | 73/49.2 |
| 4,708,015 | 11/1987 | Sharp | 73/49.2 |
| 4,721,950 | 1/1988 | Andrejasich et al. | 340/603 |

Primary Examiner—Reinhard J. Eisenzopf
Assistant Examiner—Robert W. Mueller
Attorney, Agent, or Firm—Tarolli, Sundheim & Covell

[57] ABSTRACT

A system for containing and detecting the leakage of liquid from a receiver, such as a tank or conduit, includes absorbent material which is capable of absorbing liquid which leaks from the receiver. The absorbent material is enclosed by casing material which is dissolvable by the liquid in the receiver. Upon the occurrence of a leak, the liquid which leaks from the receiver dissolves the casing material to expose the absorbent material so that it can absorb the leaking liquid. A detector provides an output signal in response to leakage of liquid from the receiver. The detector may include a pair of electrodes which are electrically insulated from each other by material which is also dissolved by liquid which leaks from the receiver. When the insulating material between the electrodes is dissolved, current is conducted between the electrodes to provide the output signal. The absorbent material may be disposed in a plurality of separate containers formed of the casing material which dissolves when exposed to the liquid in the receiver or may be positioned as a unitary body beneath the receiver.

51 Claims, 3 Drawing Sheets

4,922,232

LEAKAGE CONTAINMENT AND DETECTION SYSTEMS

BACKGROUND OF THE INVENTION

The present invention relates to a method and apparatus for containing leakage from tanks, pipelines, and/or other receivers of liquid A leak detection system may be included to provide an output signal in response to the leakage of liquid.

The leakage of liquid from tanks and conduits can cause severe damage to the environment. Thus, the leakage of gasoline from an underground fuel storage tank may contaminant the environment and provide a fire hazard. The leakage of petroleum based liquids and other chemicals from underground pipelines is particularly hazardous to the environment since the leak may go undetected for a relatively long period of time. Although the leakage of liquid from underground tanks and pipelines may be particularly troublesome, the leakage of liquid from tanks or pipelines above ground is also hazardous.

BRIEF SUMMARY OF THE INVENTION

The present invention provides a new apparatus and method for the containment and/or detection of leaks from liquid receivers, such as tanks, pipelines, etc. Absorbent material is provided to contain the leakage. The absorbent material is at least partially enclosed by casing material which is dissolvable in the liquid in the receiver to enable the absorbent material to be exposed when a leak occurs. The casing material prevents the absorbent material from becoming wet before the receiver leaks.

The casing material may advantageously be used to form a plurality of containers which hold the absorbent material. The use of separate containers to hold the absorbent material facilitates the installation of the absorbent material. The containers also protect the absorbent material and maintain it in a desired location prior to the occurrence of a leak. The containers for the absorbent material may be either boxes having configurations which are dictated by the environment in which the absorbent material is to be used or flexible bags which can be deflected to accommodate almost any environment in which the absorbent material is to be used. Although it is preferred to place the absorbent material in a container, it is contemplated that individual particles of the absorbent material could be enclosed by casing material which is dissolvable in the liquid disposed in the receiver.

A signal may advantageously be provided by a detector when a leak occurs. The detector may include an electrode which is insulated by the casing material. Therefore, when liquid leaks from the receiver and comes in contact with the insulation, the insulation is at least partially dissolved to expose the electrode.

In one embodiment of the invention, a pair of electrodes are disposed on opposite sides of a wall of a container of the absorbent material. The wall of the container may be provided with a recess adjacent to the electrodes to temporarily hold liquid which leaks from a receiver to thereby promote dissolving of the wall of the container adjacent to the electrodes. It is contemplated that the electrodes could be mounted separately from the wall of a container which encloses the absorbent material if desired.

The absorbent material may be installed beneath an existing underground tank, pipeline or other liquid receiver. When this is to be done, the earth is dug out from beneath the receiver to form a space. The absorbent material is positioned in the space while the receiver is maintained in the ground. When the absorbent material is disposed in one or more containers of material which are dissolvable in the liquid in the receiver, the containers are positioned in the underground space below the receiver. However, if desired, particles of the absorbent material may be covered with casing material and then blown or otherwise moved into the space beneath the liquid receiver.

Accordingly, it is an object of this invention to provide a new and improved method and apparatus for leakage containment and wherein absorbent material is at least partially enclosed by material which is dissolvable in a liquid which may leak from a tank, pipeline or other liquid receiver.

Another object of this invention is to provide a new and improved method and apparatus as set forth above and wherein a detector provides an output signal in response the leakage of liquid.

BRIEF DESCRIPTION OF THE DRAWINGS

The foregoing and other objects and features of the present invention will become apparent upon a consideration of the following description taken in connection with accompanying drawings, wherein.

DESCRIPTION OF SPECIFIC PREFERRED EMBODIMENTS OF THE INVENTION

General Description Of One Embodiment

An underground storage tank 10 (FIG. 1) holds a liquid, specifically, gasoline. The storage tank 10 is filled with gasoline through an underground conduit 12. If gasoline should leak from either the tank 10 or conduit 12, environmental damage could result. In addition, there could be a substantial fire hazard.

Figure 1:
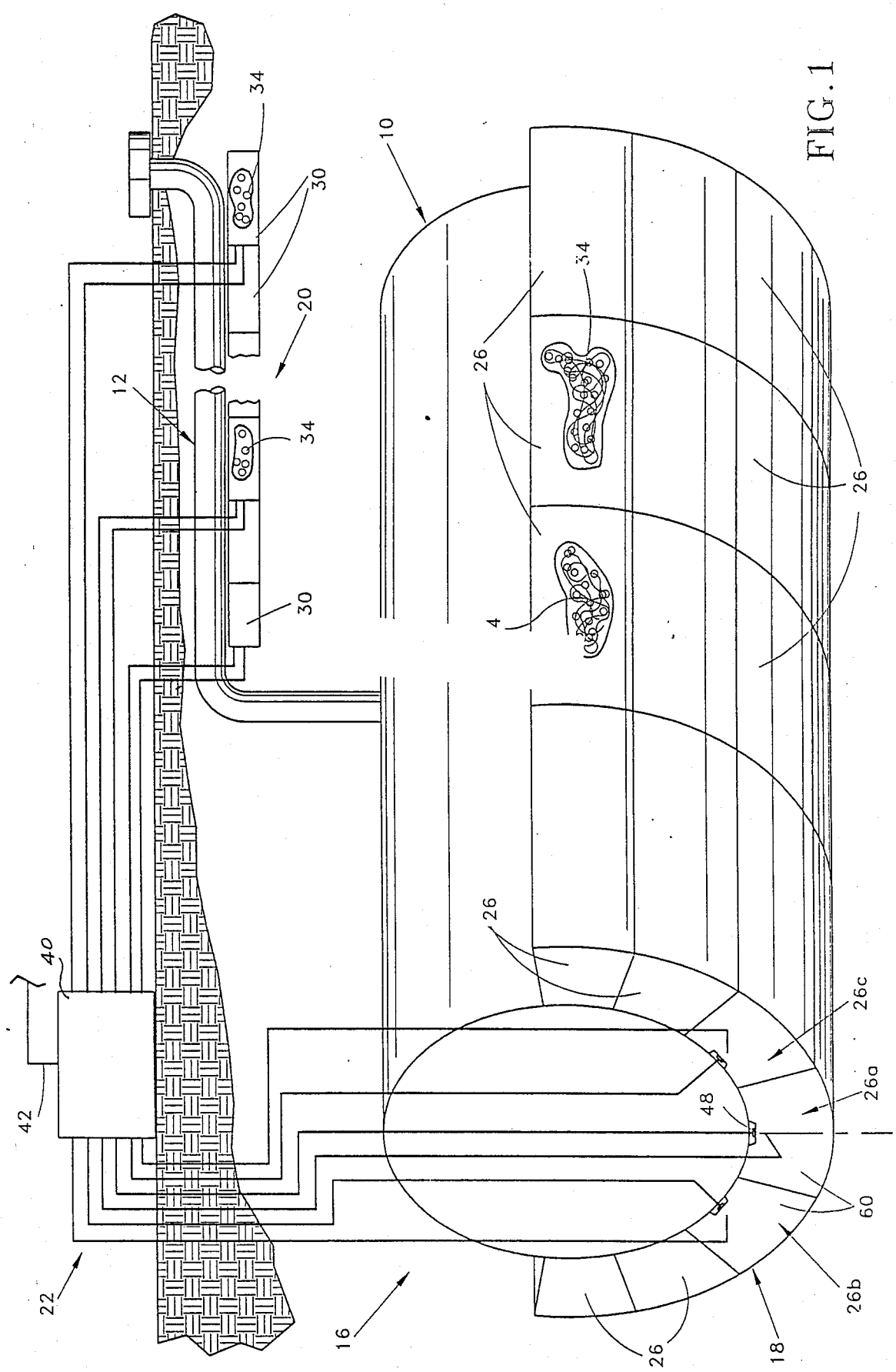
FIG. 1 is a schematic illustration depicting the relationship between an underground conduit and a tank to absorbent material which is at least partially enclosed in casing material which is dissolvable in the liquid in the tank and/or conduit.

In accordance with a feature of the present invention, a leakage containment and detection system 16 is provided in association with both the tank 10 and conduit 12. The system 16 includes leakage containment apparatus 18 associated with the tank 10 and leakage containment apparatus 20 associated with the conduit 12 to contain any liquid which may leak from either the tank or conduit. A detection system 22 is connected with the leakage containment apparatus 18 and 20 to provide an output signal in response to a leakage of liquid from the tank 10 and/or conduit 12. It should be understood that although the leakage containment apparatus 18 and 20 and detection system 22 are illustrated in FIG. 1 in association with an underground tank 10 and relatively short underground pipe 12, the leakage containment apparatus and detector system could be associated with tanks, conduits, pipelines or other liquid receivers disposed above and/or below the ground.

The leakage containment apparatus 18 associated with the tank 10 includes a plurality of containers 26 disposed in a side-by-side relationship around the outside of the tank 10. The containers 26 form a layer which is disposed beneath the tank. The layer of containers 26 extends upwardly from the lower portion of the tank.

Similarly, a plurality of containers 30 are disposed beneath the conduit 12. In the embodiment of the invention illustrated in FIG. 1, the containers 30 are disposed entirely beneath the conduit 12 and do not extend upwardly along the side of the conduit. However, the containers 30 could extend upwardly along the side of the conduit 12 if desired. The containers 30 are disposed in a side-by-side relationship to form a layer of containers disposed beneath the conduit 12.

All of the containers 26 and 30 contain absorbent material 34. The absorbent material 34 is capable of absorbing any liquid which leaks from the tank 10 and/or conduit 12. The containers 26 are of a size and/or number to hold sufficient absorbent material 34 to absorb all of the liquid in the tank 10 if the tank was completely filled. If desired, the containers 26 could be designed to hold a volume of absorbent material 34 which is capable of absorbing a volume of liquid which is less than the entire volume of the tank 10.

Since there is a flow of liquid through the conduit 12, the containers 30 may be of a size to hold absorbent material 34 which is only capable of absorbing a portion of the volume of the conduit 12. Of course, the containers 30 could be designed to hold sufficient absorbent material 34 to absorb a volume of liquid equal to or greater than the volume of the conduit 12.

The containers 26 and 30 are formed of a casing material which is destroyed, that is, dissolved, by contact with liquid from the tank 10 and/or conduit 12, to expose the absorbent material 34. Thus, if the tank 10 and conduit 12 receive gasoline, the casing material of the containers 26 and 30 would be dissolved by any gasoline which may leak from the tank 10 or the conduit 12. Of course, the casing material of the containers 26 and 30 is selected so as to be dissolved by exposure to the particular liquid to be received in the tank 10 and conduit 12. However, the containers 26 and 30 are advantageously formed of a material which is impervious to water so that the absorbent material 34 is not soaked with ground water before a leak occurs.

Although the leakage containment apparatus 18 and 20 could be used by itself, it is advantageously used with the detection system 22. The detection system 22 provides an output signal in response to the leakage of liquid from the tank 10 or conduit 12. The detection system 22 includes electrodes which are disposed beneath the tank 10 and conduit 12. The electrodes are electrically insulated by casing material which dissolves when exposed to the liquid associated with the tank 10 and conduit 12. Thus, when liquid leaks from the tank 10 or conduit 12, the liquid destroys, that is, dissolves, the insulating material to expose one or more electrodes in the area where the leak occurred.

A controller 40 is connected with the electrodes. The controller 40 provides an output signal indicative of a leak when the insulating material associated with an electrode is dissolved. By indicating the electrode or electrodes around which the insulating material is dissolved by a leak from the tank 10 and/or conduit 12, the controller 40 can provide an output signal over a cable 42 indicating the general location of the leak.

In the illustrated embodiment of the invention, a pair of electrodes 46 and 48 (FIG. 2) are associated with a container 26a. The electrode 46 is disposed inside the container 26a. The electrode 48 is disposed outside of the container 26a. The casing material of the container 26a functions to electrically insulate the electrodes 46 and 48 from each other. Although it is preferred to use a pair of electrodes 46 and 48, a single electrode could be used if desired.

Figure 2:
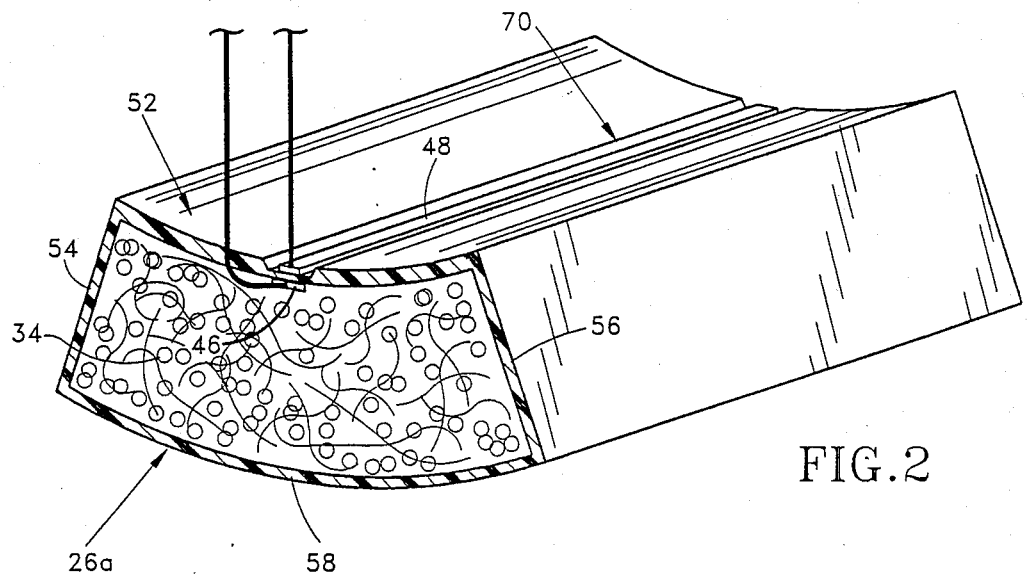
FIG. 2 is a sectional view of a container of absorbent material used in conjunction with the tank of FIG. 1 and illustrating the manner in which a pair of electrodes are mounted on opposite sides of a wall of the container.

Although only electrodes 46 and 48 for the container 26a have been illustrated in FIG. 2, it should be understood that electrodes could be associated with other containers at different locations relative to the tank. Thus, the controller 40 has been illustrated in FIG. 1 as also being connected with electrodes associated with the containers 26b and 26c. It is contemplated that electrodes will also be associated with the containers 26 which are horizontally aligned with the containers 26a, 26b and 26c. This could be done by having the electrodes 46 and 48 extend for the axial length of the cylindrical tank 10. It could also be done by having separate electrodes for each of container 26 connected with the controller 40. If desired, all of the containers 26 could be provided with electrodes similar to the electrodes 46 and 48.

Electrodes, similar to the electrodes 46 and 48, are associated with the containers 30 (FIG. 1) disposed beneath the conduit 12. These electrodes are electrically insulated from each other by the material which forms the containers 30. Thus, one electrode is disposed inside a container 30 while another electrode is disposed outside of the container. In the embodiment of the invention illustrated in FIG. 1, only every other container 30 is provided with electrodes which are connected with the controller 40. However, all of the containers 30 could be provided with electrodes if desired.

The material which electrically insulates the electrodes can be the same casing material which is used to form the containers 26 and 30 or could be a different material. However, if a different material is used to insulate the electrodes, this material would also dissolve when exposed to the liquid in the tank 10 or conduit 12. Thus, both the material forming the containers 26 and 30 and the material which is used to electrically insulate the electrodes will dissolve when exposed to liquid which has leaked from the tank 10 or conduit 12. Although it is preferred to have a pair of electrodes with one disposed inside the container and the other disposed outside of a container, a greater or lesser number of electrodes could be used and all of the electrodes could be disposed either inside or outside of the containers.

If the tank 10 was disposed above the ground, the containers 26 could be secured to the lower portion of the tank by suitable mechanical fasteners and/or adhesive. Similarly, if the conduit 12 was disposed above the ground, the containers 30 could be secured to the lower portion of the conduit by suitable mechanical fasteners and/or adhesive. To maintain the integrity of the absorbent material 34, the containers would be impervious to any environmental conditions to which the containers are exposed before a leak occurred.

Container

The container 26a (FIG. 2) is a box which maintains its shape when filled with the absorbent material 34. However, the container 26a may be flexed somewhat to comform to the shape of the tank 10. By preshaping the container 26a to conform to the shape of the tank 10, installation of the container is facilitated. It is believed that the preshaping of the containers of absorbent material will be particularly advantageous when they are to be used with liquid receivers disposed above the ground.

The container 26a has an arcuate upper wall 52 which is shaped to abuttingly engage the outer side surface of the tank 10 in the manner illustrated in FIG. 1. A pair of flat side walls 54 and 56 extend outwardly from the upper or inner wall 52. The side walls 54 and 56 are shaped to abuttingly engage the side walls of adjacent containers 26b and 26c. The container 26a has an arcuate bottom or outer wall 58 which extends between the side walls 54 and 56. A pair of parallel end walls 60 (only one of which is shown in FIG. 1) extend between the walls 52, 54, 56 and 58 at opposite ends of the container 26a.

The walls of the container 26a are interconnected and sealed. The walls of the container 26a are impervious to water. Therefore, water cannot leak into the container 26a and the absorbent material 34 (FIG. 2) remains dry even though the container 26a is exposed to ground water.

The container 26a is formed of a casing material which is destroyed, that is, dissolved, by exposure to the liquid in the tank 10. In the specific embodiment illustrated herein, it is contemplated that the tank 10 will hold gasoline. Therefore, the casing material from which the container 26a is formed can be dissolved by gasoline.

Although the containers 26 could be formed of many different casing materials, in one specific instance, the containers were formed of a polystyrene resin. Although only the upper portions of the containers 26 need be formed of a casing material which dissolves in the liquid in the tank 10, in the illustrated embodiment of the invention, each of the containers is formed entirely of the same material. Although many different types of polystyrene resins could be used as a material for the containers 26, one suitable polystyrene resin is sold under the trademark STYRON by Dow Chemical Company of Midland, Michigan. Of course, other materials could be utilized. If the tank 10 is to contain a liquid other than gasoline, the material of the containers 26 would be selected so that it would be dissolved in the specific liquid which is to be held in the tank 10.

The walls 52, 54, 56, 58 and 60 of the container 26a are somewhat flexible. However, the container walls 52, 54, 56, 58 and 60 have sufficient rigidity to hold their shape when the container 26a is filled with the absorbent material 34. The force of the earth around the tank 10 and container 26a presses the walls of the container against the tank 10 and against the absorbent material 34. The absorbent material 34 has sufficient structural rigidity to support the walls.

Although the walls 52, 54, 56, 58 and 60 of the container 26a have sufficient rigidity to enable the container to hold its general configuration when it is filled with the absorbent material 34, the walls are thin enough to enable them to be quickly dissolved when they are exposed to liquid which is may leak from the tank 10. Thus, in one specific embodiment, the walls 52, 54, 56 and 58 and 60 had a thickness of less than one-eighth of an inch. Depending upon the amount of leakage, these thin walls 52, 54, 56, 58 or 60 can be at least partially dissolved by liquid which leaks from the tank 10 in less than four minutes. It should be understood that the foregoing wall thickness and dissolving time have been set forth for purposes of clarity of description and not for purposes of limitation of the invention.

Although only the construction of the container 26a has been illustrated in FIG. 2, it should be understood that the other containers 26 and the containers 30 have the same general construction as the container 26a. However, electrodes, corresponding to the electrodes 46 and 48 of FIG. 2, may or may not be associated with all of the containers. It is contemplated that material which is separate from the containers 26 and 30 may be used to electrically insulate the electrodes from each other. If separate insulating material is used for the electrodes, the insulating material would not have to be of the same composition as the containers. However, the material would be dissolvable in the liquid to be held in the receiver with which the electrodes are to be associated.

Absorbent Material

The containers 26 and 30 are filled with the absorbent material 34. Thus, the absorbent material 34 presses against the sidewalls of the containers 26 and 30. The absorbent material 34 also presses against an exposed lower side surface of an electrode 46 (FIG. 3) disposed in the container 26a.

The absorbent material 34 has a generally rigid skeletal structure which defines open cells. The open cells in the absorbent material receive any liquid which leaks from the tank 10 or conduit 12 to contain the liquid and prevent damage to the surrounding environment. In the illustrated embodiment of the invention, the combined volume of the open cells in the absorbent material 34 in all of the containers 26 is capable of holding a volume of liquid equal to the volume of liquid in the tank 10 when the tank is completely filled. Of course, a smaller amount of absorbent material could be provided if a lesser degree of protection is acceptable.

The rigid skeletal structure of the open celled absorbent material 34 keeps the open cells from collapsing under the influence of pressure applied against the flexible walls of the containers 26 and 30. Although the absorbent material 34 has a rigid skeletal structure, it is relatively light in weight. This is because open cells form the majority of the volume of the absorbent material.

A pound of one specific absorbent material contains enough open cells to contain about a gallon of liquid. Of course, the volume of the open cells in a pound of the absorbent material 34 will vary depending upon the specific absorbent material used. The rigid skeletal structure of the absorbent material 34 does not dissolve in the liquid contained in the tank 10 and conduit 12. Therefore, the open cell structure of the absorbent material is maintained after the liquid from the tank 10 and/or conduit 12 has been conducted into the open cells.

The specific absorbent material 34 referred to in the preceding paragraph may be a light weight aggregate formed by expanding particles by 2 to 10 times their original size to a size of at least one-half of an inch. In order to enable the absorbent material to withstand compressive forces to which the containers 26 and 30 are subjected, the skeletal structure of the absorbent material 34 has a compressive strength of at least 200 p.s.i. This specific absorbent material 34 has a weight of approximately 2 to 20 lbs./cu. ft. The particles of this absorbent material may be formed in the manner disclosed in U.S. patent application Ser. No. 142,508 filed by Joseph F. Bosich on Jan. 7, 1988 and entitled "A Process of Making Material for and Constructing a Road." Of course, other materials may be used as the absorbent material 34 if desired. Thus, expanded perlite could be used.

Detection System

The detector system 20 provides an output signal in response to leakage of liquid from the tank 10 and/or conduit 12. The detection system 22 includes an inner electrode 46 which is secured to an inner side surface of the upper wall 52 of the container 26a (FIG. 2). The absorbent material 34 presses against the inner electrode 46. An outer electrode 48 extends parallel to the inner electrode 46 and is secured to the outside of the upper wall 52. Thus, the electrodes 46 and 48 are supported by and are electrically insulated from each other by the upper wall 52 of the container 26a (FIG. 3).

Figure 3:
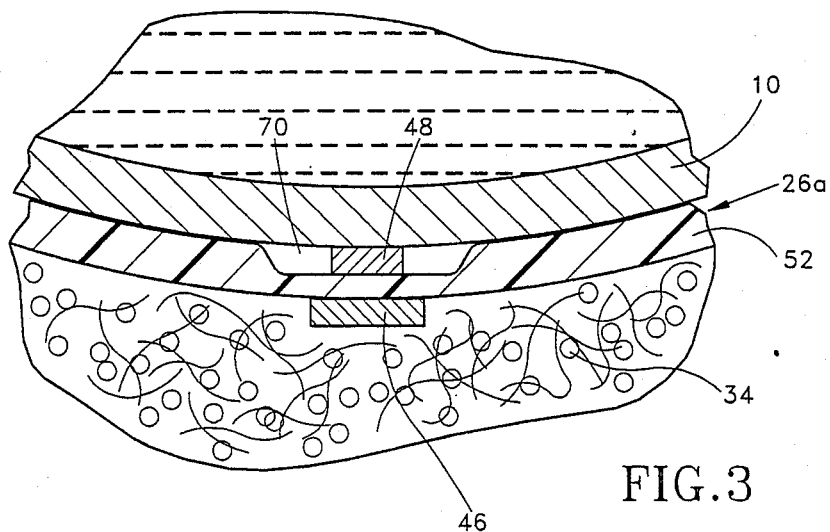
FIG. 3 is an enlarged fragmentary sectional view further illustrating the relationship of the electrodes to each other and, to the wall of the container and the tank of FIG. 1 prior to the occurrence of a leak.

Material which forms the upper wall 52 of the container 26 electrically insulates the electrode 46 from the electrode 48 before the upper wall 52 of the container 26a is exposed to the liquid in the tank 10 (FIG. 3). When a leak develops in the tank 10, the upper wall 52 of the container 26a is at least partially exposed to the liquid which leaks from the tank 10. This liquid dissolves at least a portion of the material of the upper wall 52 of the container 26a to form a hole or opening 66 (FIG. 4).

When liquid begins to leak from the tank 10 and dissolve the casing material forming the upper wall 52 of the container 26a, a very small opening is initially formed in the container. As liquid from the tank 10 passes through this opening, the liquid will provide an electrical connection between the inner and outer electrodes 46 and 48. Upon completion of the electrical connection between the inner and outer electrodes 46 and 48, the controller 40 (FIG. 1) provides an output signal over a lead 42 to indicate the presence of a leak in the tank 10.

Figure 4:
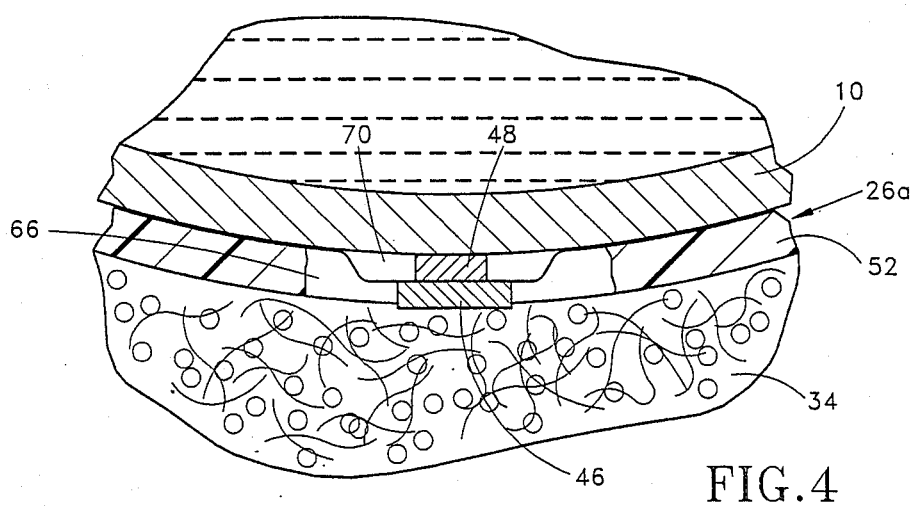
FIG. 4 is a fragmentary sectional view, generally similar to FIG. 3, illustrating the relationship between the electrodes after a portion of the container has been dissolved by liquid which has leaked from the tank.

As liquid continues to leak from the tank 10, the size of the opening 66 in the upper wall of the container increases and the flexible electrode strips 46 and 48 move into abutting engagement with each other in the manner shown in FIG. 4. Of course, this provides a solid electrical connection between the two electrodes. Continued leakage of liquid from the container 10 results in continued destruction of the material of the container 26a. Although the container 26a may be completely destroyed, almost all of the liquid which leaks from the tank 10 will be contained by the absorbent material 34. Of course, the controller 40 (FIG. 1) will continue to provide a signal to alert personnel that the tank 10 is leaking and that corrective action should be taken.

The electrodes associated with the containers 30 are mounted on the containers 30 in the same manner as in which the electrodes 46 and 48 are mounted on the container 26a. Although it is preferred to mount the electrode 46 in a container 26 or 30 and the electrode 48 outside of the container, in a manner similar to that shown in FIG. 3, it is contemplated that both electrodes could be disposed in one of the containers 26 or 30. Insulating material would be positioned between the electrodes to prevent the completion of an electrical circuit between the electrodes until insulating material has been dissolved. If desired, a spring or other biasing device could be used to press the electrodes 46 and 48 together as the insulating material between them is dissolved. Although it is preferred to use the casing material which forms a container 26 or 30 as the insulating material between the electrodes, other known materials which can be dissolved by the liquid in the tank 10 and/or conduit 12 could be used as the insulating material if desired.

The electrodes 46 and 48 could be disposed outside of the container 26a with insulating material between the electrodes. Upon the occurrence of a leak, liquid from the tank 10 or conduit 12 would dissolve the insulating material between the electrodes. In the embodiment of the invention shown in FIGS. 1–4, the electrodes 46 and 48 connected with the containers 26a, 26b and 26c, extend for the entire length of the tank 10. If desired, separate electrodes could be provided for each of the containers 26. The electrodes associated with the containers 30 have a length equal to the length of only one of the containers.

Upon the occurrence of a leak, it is advantageous to dissolve the insulating material between the electrodes 46 and 48 with the liquid which initially leaks from the tank 10 or conduit 12 in order to provide an early alarm signal from the controller 40. To promote the destruction of the insulating material between the electrodes 46 and 48 by the liquid which initially leaks from the tank 10, a recess 70 (FIG. 3) is provided in the upper wall 52 of the container 26a adjacent to the electrodes. Both the recess 70 and the electrodes 46 and 48 extend for the entire axial length of the tank 10. The recess 70 opens upwardly toward the lowermost portion of the tank 10. Therefore, any liquid which leaks from the tank will tend to flow downwardly into the recess 70. The recess 70 will temporarily hold this liquid until an opening 66 (FIG. 4) is formed in the upper wall 52 of the container 26a in the manner shown schematically in FIG. 4. The formation of the recess 70 resulted in a thinning of the upper wall 52 of the container 26a (see FIG. 3) in the area between the electrodes 46 and 48. Therefore, the relatively thin layer of the casing material between the electrodes 46 and 48 can be quickly dissolved by the initial leakage of fluid from the tank 10 to complete the electrical connection between the electrodes immediately after the tank begins to leak.

Although the linear recess 70 has an elongated configuration that extends through the entire axial length of the tank 10, the recess could have different configuration if desired. For example, a plurality of circular recesses could be formed at spaced apart locations in the upper wall 52 of the container 26a if desired. It should be understood that recesses, corresponding to the recess 70, are provided in the upper walls of the containers 30.

Conduit Leakage Containment

The leakage containment apparatus 20 associated with the conduit 12 has the same general construction and mode of operation as the leakage containment apparatus 18 associated with the tank 10. Thus, the leakage containment apparatus 20 for the conduit 12 includes a plurality of containers 30 which are filled with absorbent material. The containers 30 have a generally rectangular configuration. However, an upper wall of the containers are shaped to abuttingly engage a lower wall of the conduit 12. The containers 30 of the conduit leakage container apparatus 20 are formed of the same material as the containers 26 of the tank leakage containment apparatus 18. Therefore, the walls of the containers 30 are quickly dissolved when material leaks from the conduit 12.

The absorbent material 34 in the containers 30 is the same as the absorbent material 34 in the containers 26. Thus, the open celled absorbent material 34 in the containers 30 is exposed when the walls of the container 30 are dissolved. The absorbent material 34 then absorbs the liquid which leaks from the conduit 12 to contain the liquid and prevent environmental pollution.

The detector system 22 is connected with the containers 30 of the conduit leakage containment apparatus 20 in the same manner as in which they are connected with the containers 26 of the tank leakage containment apparatus 18. Thus, inner and outer electrodes, corresponding to the electrodes 46 and 48 of FIG. 2, are disposed on opposite sides of an upper wall of containers 30 in the conduit leakage containment apparatus 20. When liquid leaks from the conduit 12, the casing material forming the upper walls of the container 30 dissolves between the electrodes to enable an electrical connection to be completed. Although the conduit 12 has been shown as being relatively short and connected with the tank 10 in FIG. 1, it is contemplated that the conduit leakage containment apparatus 20 could be associated with a very long pipeline which may be located above or below ground.

Container - Second Embodiment

Figure 5:
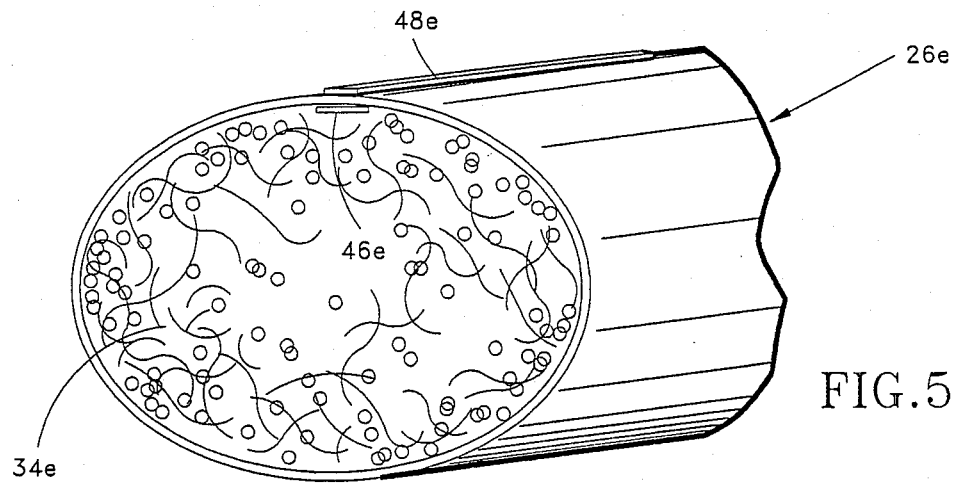
FIG. 5 is a fragmentary schematicized illustration of another embodiment of the invention in which absorbent material is enclosed in a flexible bag of casing material.

In the embodiment of the invention illustrated in FIGS. 1-4, the containers 26 and 30 have a generally box-like configuration and are formed of a flexible material having sufficient rigidity to hold a preselected configuration when they are filled with the absorbent material 34. In the embodiment of the invention illustrated in FIG. 5, the container is a flexible bag which is easily deflected to fit the configuration of the surroundings of any liquid receiver with which the bag is associated. Since the embodiment of the invention illustrated in FIG. 5 is generally similar to the embodiment of the invention illustrated in FIGS. 1-4, similar numerals will be utilized to designate similar components, the suffix letter "e" being associated with the embodiment of the invention illustrated in FIG. 5 in order to avoid confusion.

A container 26e contains absorbent material 34e. The absorbent material is capable of absorbing liquid which leaks from a tank, corresponding to the tank 10 of FIG. 1, a conduit, corresponding to the conduit 12 of FIG. 1, or other liquid receiver. The container 26e is formed of a casing material which is destroyed, that is dissolved, by contact with liquid from the receiver with which the container is associated. This results in the absorbent material 34e in the flexible bag or container 26e being exposed to the liquid which has leaked from the receiver.

A plurality of bags 26e may be placed beneath a liquid receiver, in the same manner in which the containers 26 and 30 are placed beneath the liquid receivers 10 and 12. However, the bag 26e may be very large so that only one bag would be used to hold a volume of absorbent material 34e sufficient to absorb all of the liquid in a tank. This large bag could be placed beneath the tank and then filled with absorbent material 34e. After being filled, the bag would be sealed.

A pair of electrodes 46e and 48e are connected with a controller, similar to the controller 40 of FIG. 1, and detect the leakage of liquid from a tank and/or conduit. The electrode 46e is disposed inside bag or flexible container 26e. The electrode 48e is disposed outside the container. The electrodes 46e and 48e are both fixedly connected to a portion of the bag 26e which will be uppermost, in the same manner as shown in FIG. 5, when the bag is installed in conjunction with a liquid receiver. The electrode 46e is electrically insulated from the electrode 48e by the casing material which forms the bag or container 26e. When the bag or container is exposed to liquid which leaks from a receiver, the portion of the bag between the electrodes 46e and 48e is dissolved by the liquid to complete an electrical circuit between the electrodes 46e and 48e.

Although it is preferred to mount the electrodes 46e and 48e on opposite sides of a wall of the bag 26e so that the casing material forming the bag acts as an insulator, the electrodes could both be disposed inside of the bag 26e if desired. If this were done, an insulating material which is dissolvable in the liquid in a receiver, such as a tank or conduit, with which the bag 26e is associated would be provided between the electrodes. Similarly, the electrodes 46e and 48e could be disposed outside of the bag 26e and electrically insulated from each other by a casing material which may be the same as or different than the casing material forming the container 26e.

In one specific instance, the container 26e was formed of a flexible polyethylene sheet material. The polyethylene forming the sheet material is commercially available under the trademark POLYKEN resin sold by Kendall Company of Boston, Massachussetts, U.S.A. The polyethylene sheet material forming the bag 26e is dissolvable in gasoline held in the tank or conduit with which the bag 26e is to be associated. Of course, if a different liquid was to be held in the tank or conduit with which the bag 26e is to be associated, the bag would be formed of a material which can be dissolved by that particular liquid.

Cathodic Protection Galvanic Anode

Figure 6:
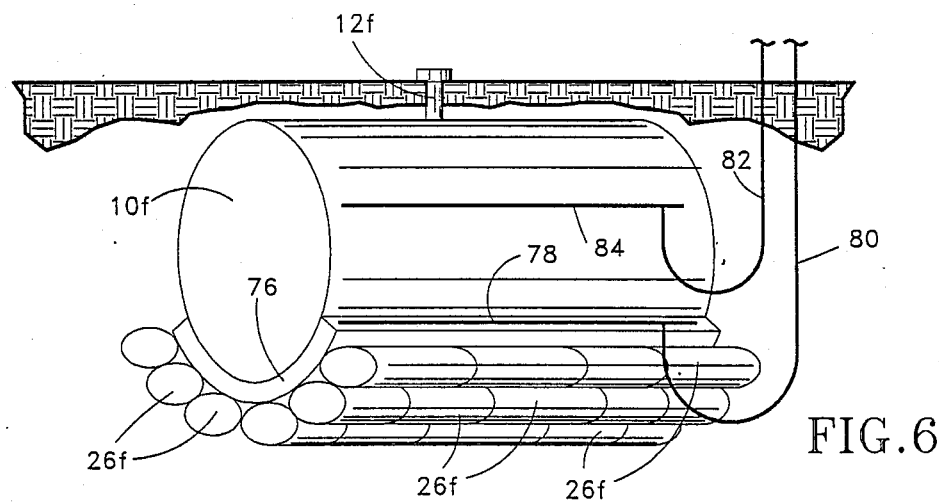
FIG. 6 is a fragmentary sectional view depicting the relationship between an underground tank or liquid receiver, a cathodic protection anode, and bags of absorbent material.

It is contemplated that it may be desirable to provide cathodic protection for the tank in which liquid is to be held. Therefore, in the embodiment of the invention illustrated in FIG. 6, cathodic protection is provided for the tank. Since the embodiment of the invention illustrated in FIG. 6 is generally similar to the embodiment of the invention illustrated in FIGS. 1-4, similar numerals will be utilized to designate similar components, the suffix letter "f" being associated with FIG. 6 to avoid confusion.

In order to provide cathodic protection for the tank 10f, an anode 76 is welded to the tank. The anode 76 has the same general arcuate configuration as the tank 10f and abuttingly engages the tank.

The anode 66 is formed of a metal which is higher in the electrical potential series than the metal of the tank 10f. Thus, the galvanic anode 76 may be formed of zinc, while the tank 10f is formed of iron or steel. An electrode 78 is attached to the anode 76 and is connected with a source of electrical potential by a lead 80. A second lead 82 is connected with an electrode 84 which is secured to the tank 10f.

Containers of absorbent material are disposed immediately beneath the tank 10f and anode 76. The containers 26f of absorbent material may advantageously be bags of absorbent material and having the same construction as explained in conjunction with FIG. 5.

Existing Receiver

Figure 7:
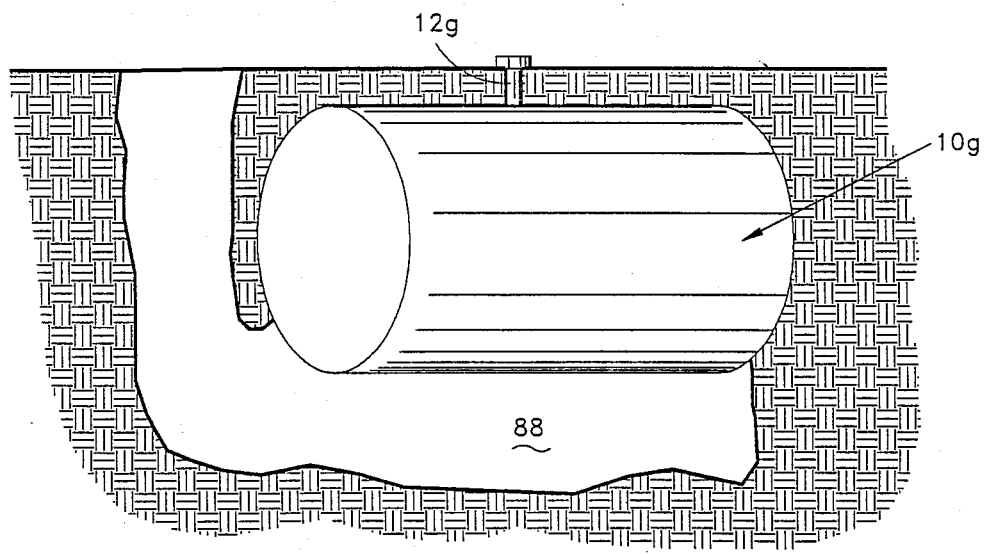
FIG. 7 is a schematic illustration depicting the manner in which earth is dug out from beneath an underground tank to provide a space for receiving absorbent material.

The foregoing description of the leakage containment apparatus and detection systems have been in conjunction with installation of new tanks, conduits or other liquid receivers. It is contemplated that it will be advantageous to use the leakage containment apparatus and the detection system in association with existing liquid receivers. Accordingly, in the embodiment of the invention illustrated in FIG. 7, the leakage containment apparatus and detection system is utilized in conjunction with an existing underground tank. Since the embodiment of the invention illustrated in FIG. 7 is similar to the embodiment of the invention illustrated in FIGS. 1-4, similar numerals will be utilized to designate similar components, the suffix letter "g" being associated with the numerals of FIG. 7 to avoid confusion.

An underground tank 10g has the same general construction as the tank 10 of FIG. 1 and is connected with a conduit 12g. In order to prevent environmental pollution in the event of the development of a leak in the tank 10g, a leakage containment apparatus, corresponding to the leakage containment apparatus 18 of FIG. 1, and a detector system, corresponding to the detector system 22 of FIG. 1 is to be associated with the tank 10g of FIG. 7.

Since the tank 10g was previously installed underground without a leakage containment apparatus and without a leak detection system, the earth must be dug from beneath the tank 10g to provide a space 88 to receive the leakage containment apparatus and portions of the detector system. Once the earth has been removed to form the space or hole 88 beneath the tank 10g, containers of the absorbent material 34 are positioned beneath the tank.

The containers which are positioned beneath the tank 10g can have the same construction as the containers 26 of FIG. 1. However, it is preferred to use the flexible bag-type containers 26e of FIG. 5. This is because the flexible bag-type containers 26e are more readily installed in the uneven space 88 beneath the tank 10g. Thus, the flexible containers 26e can be readily packed into the space 88 beneath the tank and supported by the irregular surface of the earth beneath the tank.

The bags 26e of absorbent material 34e would be positioned beneath the tank 10g with the electrodes 46e and 48e (FIG. 5) uppermost. Therefore, liquid which initially leaks from the tank 10g will quickly dissolve the insulating material between the electrodes. After the containers 26e of absorbent material 34e have been installed beneath the tank 10g and the associated electrodes 46e and 48e connected with a controller, corresponding to the controller 40 of FIG. 1, the unfilled portion of the space 88 is filled in with earth.

It is contemplated that it may be advantageous to position the absorbent material 34 as a unitary body in the space beneath the tank 10g. When this is to be done, the space 88 is first lined with a flexible casing material, such as a sheet formed of polyethylene. The polyethylene sheet material which lines the space 88 is then filled with the absorbent material 34. The absorbent material 34 may be manually moved into the casing of sheet material which lines the space 88 or may be blown into the space.

Once the casing of polyethylene sheet material has been filled with the absorbent material the casing is sealed to prevent ground water from leaking into the casing. Before the casing is sealed and after most of the absorbent material 34 has been blown or otherwise moved into the space 88, a pair of electrodes having a length which is substantially the same as the length of the tank 10g and electrically insulated from each other by material which can be dissolved by the liquid in the tank 10g, are inserted between the tank 10g and the casing which contains the absorbent material at a location immediately beneath the lowermost portion of the tank 10g. The sheet material which contains the absorbent material is then completely filled and sealed to prevent the absorbent material from being soaked with ground water. If desired, the electrodes could be positioned within sheet material container.

The use of a sheet material liner or container for the space 88 could be eliminated. This could be done by enclosing the particles of absorbent material, which are to be positioned in the space 88, with a layer or film of the casing material which is dissolvable by the liquid in the tank 10g. Thus, each particle of the absorbent material would be enclosed by the casing material which is impervious to water. The enclosed particles could then be blown or manually moved into the space 88 beneath the tank 10g. Electrodes which are electrically insulated from each other would be positioned on the upper portion of the bed of particles beneath the lowermost portion of the tank 10g.

Upon the occurrence of a leak of liquid from the tank 10g, the liquid would engage the layer or film of casing material around each of the separately enclosed particles and dissolve the film. Of course, the liquid which leaks from the tank 10g would also dissolve the insulating material between the electrodes to provide an output signal indicative of the occurrence of the leak.

Conclusion

The present invention provides a new apparatus 16 and method for the containment and/or detection of leaks from liquid receivers, such as tanks, pipelines, etc. Absorbent material 34 is provided to contain the leakage. The absorbent material 34 is at least partially enclosed by casing material which is dissolvable in the liquid in the tank 10 or conduit 12 to enable the absorbent material to be exposed when a leak occurs. The casing material is impervious to water and prevents the absorbent material 34 from becoming wet before the tank 10 or conduit 12 leaks.

The casing material may advantageously be used to form a plurality of containers 26 and 30 which hold the absorbent material 34. The use of separate containers 26 and 30 to hold the absorbent material 34 facilitates the installation of the absorbent material. The containers 26 and 30 also protect the absorbent material 34 and maintain it in a desired location prior to the occurrence of a leak. The containers 26 and 30 for the absorbent material may be either boxes having configurations which are dictated by the environment in which the absorbent material is to be used or flexible bags 26e which can be deflected to accommodate almost any environment in which the absorbent material 34 is to be used. Although it is preferred to place the absorbent material in a container 26, 26e or 30, it is contemplated that individual particles of the absorbent material 34 could be enclosed by casing material which is dissolvable in the liquid disposed in the tank 10 or conduit 12.

A signal is advantageously provided by a detection system 22 when a leak occurs. The detection system 22 may include an electrode 46 which is insulated by casing material 26 which is dissolvable by a liquid which leaks from the tank 10. Therefore, when liquid leaks from the tank 10 and comes in contact with the insulation, the insulation is at least partially dissolved to expose the electrode 46.

In one embodiment of the invention, the pair of electrodes 46 and 48 are disposed on opposite sides of a wall 52 of a container 26a of the absorbent material 34. The wall 52 of the container 26a may be provided with a recess 70 adjacent to the electrodes 46 and 48 to temporarily hold liquid which leaks from the tank 10 to thereby promote dissolving of the wall 52 of the container adjacent to the electrodes. If desired, the electrodes 46 and 48 could be mounted separately from the walls of the container 26a.

The absorbent material may be installed beneath an existing underground tank 10g (FIG. 7), pipeline or other liquid receiver. When this is to be done, the earth is dug out from beneath the receiver to form a space 88. The absorbent material 34 is positioned in the space while the receiver 10g is maintained in the ground. When the absorbent material is disposed in one or more containers 26, 26e of material which is dissolvable the liquid in the tank 10g, the containers are positioned in the underground space below the receiver. It is contemplated that the underground space 88 beneath the tank 10g may be lined with casing material which dissolves when exposed to liquid from the receiver. However, if desired, particles of the absorbent material 34 may be covered or enclosed with the casing material and then blown or otherwise moved into the space 88 beneath the tank 10g.

Although the foregoing description has related to underground liquid receivers, that is, the tank 10 and conduit 12, it is contemplated that the leakage containment apparatus 18 and 20 and the detection system 22 could be used in association with tanks, conduits or other liquid receivers disposed above the ground. While it is preferred to use the leakage containment apparatus 18 and 20 in association with the detection system 22, the leakage containment apparatus could be used separately from the detection system. The preferred absorbent material 34 has a rigid structure which defines open cells which receive liquid. Other known absorbent materials could be used if desired.

Having described specific preferred embodiments of the invention, the following is claimed:

1. An apparatus comprising receiver means for receiving a liquid, means for at least partially containing liquid which may leak from said receiver means, said means for containing liquid which may leak from said receiver means including an absorbent material capable of at least partially absorbing the liquid in said receiver means and casing material which is dissolvable in the liquid disposed in said receiver means, said casing material at least partially enclosing said absorbent material, said casing material being dissolvable by liquid which leaks from said receiver means to expose said absorbent material to the liquid which leaks from said receiver means.

2. An apparatus as set forth in claim 1 further including detector means for providing an output signal in response to leakage of liquid from said receiver means, said detector means including first and second electrodes, said first electrode being electrically insulated from said second electrode by casing material disposed between said first and second electrodes, said casing material between said electrodes being dissolvable by liquid which leaks from said receiver means to at least partially eliminate the insulation between said first and second electrodes.

3. An apparatus as set forth in claim 1 wherein said receiver means includes a tank for holding a body of liquid, said absorbent material being disposed beneath said tank, said casing material being at least partially disposed between said absorbent material and said tank.

4. An apparatus as set forth in claim 1 wherein said receiver means includes a conduit for conducting a flow of liquid, said absorbent material being disposed beneath said conduit, said casing material being at least partially disposed between said absorbent material and said conduit.

5. An apparatus as set forth in claim 1 wherein said casing material has an outer surface which is disposed in engagement with said receiver means and has an inner surface which is disposed in engagement with said absorbent material.

6. An apparatus as set forth in claim 1 wherein said absorbent material includes structure having open cells for receiving liquid which leaks from said receiver means, said casing material being flexible and at least partially supported by said structure.

7. An apparatus as set forth in claim 1 wherein said absorbent material is formed of rigid particles of a size of at least one-half inch and a compressive strength of at least 200 p.s.i.

8. An apparatus as set forth in claim 7 wherein each particle of the plurality of particles has an open cell construction to enable liquid to be held by open cells in each of the particles, each of said particles being formed of a material which is insoluble in the liquid disposed in said receiver means.

9. An apparatus as set forth in claim 8 wherein a layer of casing material surrounds each particle of the plurality of particles.

10. An apparatus as set forth in claim 1 wherein said casing material at least partially forms a plurality of containers, a portion of said absorbent material being disposed in each of said containers, said containers being disposed beneath said receiver means.

11. An apparatus as set forth in claim 10 further including detector means for providing an output signal in response to leakage of liquid from said receiver means, said detector means including an electrode disposed in one of said containers, a portion of said casing material which at least partially forms said one container being dissolvable by liquid which leaks from said receiver means to expose said electrode and the absorbent material in said one container to liquid which leaks from said receiver means.

12. An apparatus as set forth in claim 1 wherein said receiver means is buried in the ground, said casing material being impervious to water to block the absorption of water by said absorbent material.

13. An apparatus as set forth in claim 1 wherein said receiver means is formed of metal, said apparatus further including an electrode formed of a metal higher in the electropotential series than said receiver means and disposed adjacent to said receiver means, means for establishing an electrical current between said receiver means and said electrode, and means for detecting an increase in the electrical current conducted between said receiver means and electrode.

14. An apparatus as set forth in claim 1 further including detector means for providing an output signal in response to leakage of liquid from said receiver means, said detector means including first and second electrodes, said first and second electrodes being electrically insulated from each other by material which is dissolvable by liquid which leaks from said receiver to enable electrical current to flow between said first and second electrodes upon the occurrence of a leak from said receiver means.

15. An apparatus as set forth in claim 1 wherein said casing material at least partially defines an upper wall of a container disposed beneath said receiver means, said upper wall of said container having an upwardly facing recess for receiving and temporarily holding liquid which leaks from said receiver means to promote dissolving of the casing material at the recess upon the occurrence of a leak in said receiver means.

16. An apparatus as set forth in claim 15 further including detector means for providing an output signal in response to leakage of liquid from said receiver means, said detector means including an electrode disposed adjacent to a lower surface of said recess.

17. An apparatus as set forth in claim 1 wherein said receiver means includes a tank for holding a body of liquid, said casing material at least partially forming a plurality of containers disposed beneath said tank in a side-by-side relationship to form a layer of containers adjacent to a lower side of said tank, a portion of said absorbent material being disposed in each of said containers.

18. An apparatus as set forth in claim 17 further including detector means for providing an output signal in response to leakage of liquid from said receiver means, said detector means including a plurality of electrodes each of which is associated with a different one of said containers.

19. An apparatus as set forth in claim 1 wherein said receiver means includes a conduit for conducting a flow of liquid, said casing material at least partially forming a plurality of containers disposed beneath said conduit in a side-by-side relationship to form a layer of containers beneath said conduit, a portion of said absorbent material being disposed in each of said containers.

20. An apparatus as set forth in claim 19 further including detector means for providing an output signal in response to leakage of liquid from said receiver means, said detector means including a plurality of electrodes each of which is associated with a different one of said containers.

21. An apparatus as set forth in claim 1 further including a first electrode disposed adjacent to an outer side surface of said casing material which at least partially encloses said absorbent material and a second electrode disposed adjacent to an inner side surface of said casing material which at least partially encloses said absorbent material to electrically insulate said first electrode from said second electrode with said casing material, said casing material between said first and second electrodes being dissolvable by liquid which leaks from said receiver means to enable electrical current to be conducted between said first and second electrodes.

22. An apparatus as set forth in claim 21 wherein at least a portion of said inner side surface of said casing material is disposed in abutting engagement with said absorbent material.

23. An apparatus as set forth in claim 22 wherein said second electrode is disposed in abutting engagement with said absorbent material.

24. A method comprising the steps of retaining liquid in a receiver, providing absorbent material, at least partially enclosing the absorbent material in a casing of material which is dissolvable in the liquid in the receiver, at least partially dissolving the casing in liquid which leaks from the receiver to expose the absorbent material, and absorbing liquid which leaks from the receiver with the absorbent material.

25. A method as set forth in claim 24 further including the steps of electrically insulating a first electrode from a second electrode with material which is dissolvable in the liquid in the receiver and which is disposed between the first and second electrodes, at least partially dissolving the material between the first and second electrodes in the liquid which leaks from the receiver, said method further including establishing an electrical current between the first and second electrodes after at least partially dissolving the material between the first and second electrodes.

26. A method as set forth in claim 24 wherein said step of retaining liquid in a receiver includes holding a body of liquid in a tank, said method further including leaking liquid from the tank.

27. A method as set forth in claim 24 wherein said step of retaining liquid in a receiver includes conducting a flow of liquid through a conduit, said method further including leaking liquid from the conduit.

28. A method as set forth in claim 24 wherein the absorbent material includes a structure having open cells, said step of absorbing liquid which leaks from the receiver includes conducting liquid into the open cells in the structure.

29. A method as set forth in claim 28 further including the step of supporting the casing material with the structure having open cells.

30. A method as set forth in claim 24 wherein the receiver which retains liquid is at least partially buried in the ground, said method further including removing earth from beneath the receiver to provide a space beneath the receiver and moving absorbent material into the space beneath the receiver.

31. A method as set forth in claim 24 wherein said step of at least partially enclosing the absorbent material in a casing of material which is dissolvable includes providing a plurality of containers which are at least partially formed of the casing material and at least partially filling each of the containers with the absorbent material.

32. A method as set forth in claim 31 further including positioning an electrode in at least one of the containers, said method further including providing a signal indicative of a leak in the receiver upon performing said step of at least partially dissolving the casing material by conducting electrical energy through the electrode disposed in the container.

33. A method as set forth in claim 31 further including the step of positioning a plurality of electrodes in the plurality of containers, said step of positioning a plurality of electrodes in the plurality of containers including positioning at least some of the electrodes in different containers.

34. A method as set forth in claim 24 wherein the receiver which retains liquid is at least partially buried in the ground, said method further including removing earth from beneath the receiver to provide a space beneath the receiver and blowing particles of the absorbent material into the space beneath the receiver.

35. A method as set forth in claim 24 wherein said steps of providing absorbent material and at least partially enclosing the absorbent material in a casing of material which is dissolvable includes providing a plurality of particles of absorbent material and enclosing each of the particles of absorbent material with a layer of the casing material.

36. A method as set forth in claim 24 further including the steps of positioning a first electrode adjacent to an outer side surface of the casing, positioning a second electrode adjacent to an inner side surface of the casing to electrically insulate the first electrode from the second electrode with the material of the casing, said steps of dissolving the casing includes at least partially dissolving the portion of the casing disposed between the first and second electrodes to enable electrical current to be conducted between the first and second electrodes.

37. A method comprising the steps of providing a receiver which receives liquid, providing a plurality of containers which are at least partially formed of a material which is dissolvable by the liquid in the receiver, at least partially filling the containers with absorbent material, positioning the containers and receiver relative to each other with the containers beneath the receiver, at least partially dissolving the material of at least one of the containers with liquid which leaks from the receiver, and absorbing liquid which leaked from the receiver with the absorbent material in the one container.

38. A method as set forth in claim 37 further including electrically insulating a first electrode from a second electrode with an insulating material which is disposed between the electrodes and is dissolvable by the liquid in the receiver and at least partially dissolving the insulating material with liquid which leaks from the receiver.

39. A method as set forth in claim 38 further including the step of conducting an electrical current between the first and second electrodes to provide an output signal indicative of the dissolving of material disposed between the first and second electrodes.

40. A method as set forth in claim 37 wherein said step of positioning the containers and receiver relative to each other includes positioning outer side surfaces of the containers in abutting engagement with an outer side surface of the receiver.

41. A method as set forth in claim 37 further including mounting a first electrode on an outer side surface of the one container and mounting a second electrode on an inner side surface of the one container, electrically insulating the first electrode from the second electrode with a portion of the container disposed between the first and second electrodes, said step of at least partially dissolving the material of at least one of the containers including at least partially dissolving the portion of the container disposed between the first and second electrodes.

42. A method as set forth in claim 37 wherein said step of providing absorbent material which is at least partially enclosed in a casing which is dissolvable in the liquid in the receiver includes positioning a container which is at least partially formed of casing material beneath the receiver and, thereafter, filling the container with absorbent material.

43. A method as set forth in claim 37 wherein said step of providing a receiver which receives liquid includes providing a tank to hold liquid, said step of positioning the containers and receiver relative to each other including positioning the tank and containers with a lower portion of the tank in abutting engagement with the containers.

44. A method as set forth in claim 37 wherein said step of providing a receiver which receives liquid includes providing a conduit for conducting a flow of liquid, said step of positioning the containers and receivers relative to each other includes positioning the conduit and containers with a lower portion of the conduit in abutting engagement with the containers.

45. A method as set forth in claim 37 further including the step of positioning a plurality of electrodes in the plurality of containers, said step of positioning a plurality of electrodes in the plurality of containers including positioning at least some of the electrodes in different containers.

46. A method comprising the steps of removing earth from beneath a tank buried in the ground to provide space beneath the tank, positioning absorbent material in the space beneath the tank while the tank is still in the ground, at least partially enclosing the absorbent material in a casing material which is soluable in the liquid in the tank and is impervious to water, at least partially dissolving the casing material which encloses the absorbent material with liquid which leaks from the tank, and absorbing liquid which leaks from the tank with the absorbent material.

47. A method as set forth in claim 46 wherein said step of enclosing the absorbent material includes placing the casing material in the space beneath the tank and then performing said step of positioning absorbent material in the space beneath the tank.

48. A method as set forth in claim 47 wherein said step of positioning absorbent material in the space beneath the tank includes blowing the absorbent material into the space beneath the tank.

49. A method as set forth in claim 46 wherein said step of enclosing the absorbent material in a casing includes forming a pluality of containers which are at least partially formed of the casing material which is soluable in the liquid in the tank and at least partially filling the containers with the absorbent material, said step of positioning the absorbent material in the space beneath the tank including positioning the containers of absorbent material in the space beneath the tank.

50. A method as set forth in claim 49 further including positioning a first electrode adjacent to an inner side surface of one of the containers and positioning a second electrode adjacent to an outer side surface of the one container to electrically insulate the first electrode from the second electrode with the material of the container, said step of dissolving the casing material includes at least partally dissolving material disposed between the first and second electrodes.

51. A method as set forth in claim 46 further including electrically insulating a first electrode from a second electrode with material which is dissolvable in liquid which leaks from the tank and which is disposed between the first and second electrodes, said step of dissolving the casing material including at least partially dissolving the material between the first and second electrodes.

* * * * *